(12) United States Patent
Speranza

(10) Patent No.: US 7,904,056 B2
(45) Date of Patent: Mar. 8, 2011

(54) SYSTEM, METHOD AND APPARATUS FOR RECORDING AND REPRODUCING TRADING COMMUNICATIONS

(75) Inventor: Michael Speranza, Massapequa, NY (US)

(73) Assignee: IPC Systems, Inc., New York, NY (US)

( * ) Notice: Subject to any disclaimer, the term of this patent is extended or adjusted under 35 U.S.C. 154(b) by 1377 days.

(21) Appl. No.: 11/276,794

(22) Filed: Mar. 14, 2006

(65) Prior Publication Data

US 2007/0263783 A1 Nov. 15, 2007

Related U.S. Application Data

(60) Provisional application No. 60/743,390, filed on Mar. 1, 2006.

(51) Int. Cl.
*H04L 12/58* (2006.01)

(52) U.S. Cl. ............................ 455/412.1; 455/426.1

(58) Field of Classification Search ............... 379/45, 379/51, 73, 68–88.28; 375/241; 455/566
See application file for complete search history.

(56) References Cited

U.S. PATENT DOCUMENTS

| | | | | |
|---|---|---|---|---|
| 3,991,282 | A * | 11/1976 | Feil | 379/158 |
| 5,126,981 | A * | 6/1992 | Kim | 369/2 |
| 5,237,571 | A * | 8/1993 | Cotton et al. | 370/390 |
| 5,481,595 | A * | 1/1996 | Ohashi et al. | 379/88.27 |
| 5,539,145 | A * | 7/1996 | Kuribayashi et al. | 84/602 |
| 5,774,192 | A * | 6/1998 | Koyama | 348/715 |
| 5,802,460 | A * | 9/1998 | Parvulescu et al. | 455/92 |
| 6,600,874 | B1 * | 7/2003 | Fujita et al. | 386/96 |
| 6,956,795 | B2 * | 10/2005 | Schwartz | 369/7 |
| 6,959,075 | B2 * | 10/2005 | Cutaia et al. | 379/202.01 |
| 6,965,804 | B1 * | 11/2005 | Mercs et al. | 700/94 |
| 7,325,122 | B2 * | 1/2008 | Abdelilah et al. | 712/14 |
| 7,809,388 | B1 * | 10/2010 | Othmer | 455/518 |
| 2002/0080925 | A1 * | 6/2002 | Tokunaga | 379/67.1 |
| 2002/0172332 | A1 | 11/2002 | Carroll et al. | 379/67.1 |
| 2003/0014243 | A1 * | 1/2003 | Lapicque | 704/203 |
| 2004/0047451 | A1 * | 3/2004 | Barker et al. | 379/67.1 |
| 2004/0264485 | A1 | 12/2004 | Okamura | |

(Continued)

FOREIGN PATENT DOCUMENTS

EP 1 679 865 A1 7/2006

(Continued)

OTHER PUBLICATIONS

"Harnessing the Power of ITS.Netrix", BT, Dec. 2004.

(Continued)

*Primary Examiner* — Simon Sing
*Assistant Examiner* — Assad Mohammed
(74) *Attorney, Agent, or Firm* — Fitzpatrick, Cella, Harper & Scinto

(57) ABSTRACT

Apparatus, method and system are provided for recording and reproducing audio channel signals. A processor captures the audio channel signals communicated through communication channels over a network. A circular buffer configured to store the audio channel signals captured by the processor, such that when the end of the circular buffer is reached the storing starts at a beginning of the circular buffer, is also included. An actuator actuates the processor to copy the audio channel signals stored in the circular buffer into a temporary buffer and cause the processor to reproduce the audio channel signals stored in the temporary buffer.

26 Claims, 5 Drawing Sheets

U.S. PATENT DOCUMENTS

2005/0240962 A1  10/2005  Cooper et al.
2006/0007871 A1  1/2006  Welin
2006/0045294 A1* 3/2006  Smyth ........................... 381/309

FOREIGN PATENT DOCUMENTS

WO    WO 98/06182    2/1998

OTHER PUBLICATIONS

International Preliminary Report on Patentability, PCT/US07/062347, Sep. 2, 2008.

International Search Report and Written Opinion of the International Searching Authority, PCT/US07/062347, Mar. 21, 2008.

* cited by examiner

SYSTEM, METHOD AND APPARATUS FOR RECORDING AND REPRODUCING TRADING COMMUNICATIONS

CROSS REFERENCE TO RELATED APPLICATIONS

This application claim priority to, and the benefit of, U.S. Provisional Patent Application Ser. No. 60/743,390, filed Mar. 1, 2006, which is hereby incorporated by reference in its entirety.

BACKGROUND OF THE INVENTION

1. Field of the Invention

The present invention generally relates to trader communication systems and more particularly to a trader desktop interface device.

2. Related Art

Before today's modern communication systems, trader's desks were often cluttered with telephones with hold buttons and slips of paper. Today, voice-trading platforms have been built specifically for the trading floor, offering traders elaborate telephone systems having a variety of voice and data applications. These telephone systems are known in the art as trading "turrets". Features on trading turrets include the ability to store thousands of telephone numbers, instant messaging, desktop video conferencing and integration with customer relationship management software for storing a client's vital information. Many of today's trading turrets use Voice over Internet Protocol (VoIP), which turns a telephone's audio signal into packetized form which can be communicated over a wide area network or intranet for easier routing and storage.

One integral part of the trading environment is call recording. It can resolve problem trades, reduce liability insurance premiums and be used to train new recruits. Today's trading communication systems incorporate recording features directly into the telephony system, allowing advanced features to be provided to traders, such as trader-initiated recording, call marking for quick retrieval, selective recording and trader-controlled playback with access to the last several calls.

A common trader-based recording solution allocates recording resources to traders at log-on, thus recording traders conversations regardless of which turret they choose to trade from. This provides traders with the mobility they need without jeopardizing their corporation's need to adhere to compliance guidelines. In particular, compliance guidelines require organizations to maintain a complete audit trail of financial transactions. This includes capturing and storing company-to-customer or trader-to-investor telephone conversations. Recording servers may even be placed in a remote data center, making it possible to physically separate the recording infrastructure from the trading floor.

In order for traders to playback previously recorded telephone conversations, they must obtain appropriate management approvals. In addition, typically such recordings are retrieved much later in time than when they were recorded. As a result, the playback requirements of financial and trading floor institutions as well as the technical process of physically retrieving recorded conversations are time consuming.

As is well known, information disclosed among traders in many situations requires an immediate response. For example, the audio signal that is coming out of one of several audio channels may be of a customer selling a stock at a certain price. It may be the case that this stock selling activity is indicative that the stock's price will move quickly shortly thereafter. The interaction based on this information is thus time sensitive, requiring the trader on the receiving end of this information to act quickly. If the trader were able to focus solely on the customer selling the stock, the trader may be able to react to the information when it was first provided. It is often the case, however, that the trader is listening to several audio channels simultaneously through one speaker or headset, that the trading floor is noisy, that the audio signal was not clear because several persons on different audio channels were speaking simultaneously, or simply that the trader's speaker unit or headset volume was set too low. Heretofor, there has not been available a way to recall a portion of an audio conversation for the purpose of acting on it quickly.

Accordingly, there is a need for a trading floor recording apparatus, system and method for recording a recent portion of a audio conversations.

There is also a need for a trading floor recording apparatus, system and method which records audio channels in a manner that complies with federal and local laws and the requirements of financial and trading floor institutions.

There is also a need for a trading floor recording apparatus which can discriminate one or more specific call channels from the rest during playback.

Given the foregoing, what is needed is a system, method, and apparatus for recording and reproducing trading communications, instantaneously, at the desktop.

BRIEF DESCRIPTION OF THE INVENTION

The present invention meets the above-identified needs by providing a system, method and apparatus for recording and reproducing trading communications.

In one aspect of the present invention, an apparatus, method and system are provided for recording and reproducing audio channel signals. A processor captures the audio channel signals communicated through communication channels over a network. A circular buffer configured to store the audio channel signals captured by the processor, such that when the end of the circular buffer is reached the storing starts at a beginning of the circular buffer, is also included. An actuator actuates the processor to copy the audio channel signals stored in the circular buffer into a temporary buffer and causes the processor to reproduce the audio channel signals stored in the temporary buffer Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

Terminology

To more clearly delineate the present invention, an effort is made throughout the specification to adhere to the following term definitions consistently.

The term "library" refers to a software module that is linked as a binary module to provide specific functionality to services and applications.

The term "service" refers to a software module that performs specific functions and operations on behalf of a requesting applications or another service. Typically a service executes in the same operating space (process) as applications. Services are not required to execute on the same processors as applications, and can be accessed by applications and other services via APIs that can operate over a network.

The term "facilities" refers to a grouping of services that are logically or functionally associated.

The term "Application Programming Interface (API)" refers to a set of routines that an application uses to request and carry out lower-level services performed by a computer's operating system. API also refers to a set of calling conventions in programming that define how a service is invoked through the application. APIs provide access to functions and data from a service or library.

The term "application" refers to a software module that interacts with a user. Responsibilities of applications include interpreting user input, implementing domain policies, presenting the system state, making requests from a service or library.

The present invention is directed to a system, method and apparatus for trading communications, which will now be described in more detail herein in terms of an exemplary internet protocol (IP) based communication system 100. This is for convenience only and is not intended to limit the application of the present invention. In fact, after reading the following description, it is apparent to one skilled in the relevant art(s) how to implement the following invention in alternative embodiments (e.g., non-IP based telephony systems).

Figure 1:
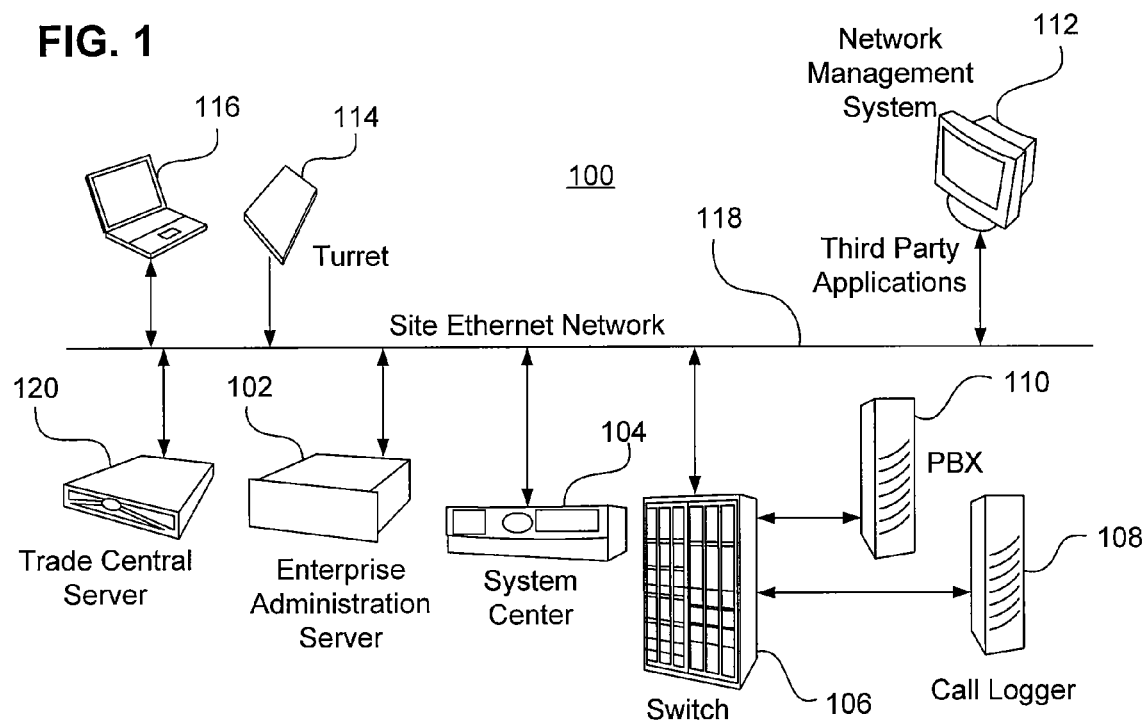
FIG. 1 is a system diagram of an exemplary telephony system 100 in which the present invention, in an embodiment, would be implemented.

FIG. 1 is a system diagram of an exemplary trader communication system 100 in which the present invention, in an embodiment, would be implemented. System 100 includes a trader desktop interface, or turret 114, in communication with a network 118 and configured to communicate with other system components. Preferably, the network 118 is a dedicated Ethernet IP network for turret services and applications. However, this network may also include TDM components, specifically the connection from turret 114 to switch 106. The network physically connects the different turret units. In one embodiment of the present invention, the network supports multiple IP protocols including a message bus. The network 118 supports well known network protocols (e.g., IP, UDP, TCP, RTP, SFTP, DNS, NTP, SSH, ODBC/COS, SSH/VPN tunneling, UDT/COS, RTCR/COS, I-Link/COS, HTTP, SNMP, Sys Log for Logging.

Turret 114 is the primary user device for the system capable of providing displays, accepting microphone input, outputting voice through speakers, and controlling handsets, buttons and LEDs to use the features of system 100.

System 100 also includes a system center 104 which is used as the system's primary configuration repository. Depending on the configuration, system center 104 provides turret 114 with the configuration information required to interact with telephony switch 106. System center 104 also contains the information about 1) the turret hardware configurations; 2) software downloaded or to be downloaded by the turret 114; 3) trader preferences for applications; 4) network management for the turret 114; and 5) tools and utilities to manage and administrate turret 114.

Switch 106 provides turret 114 with a voice data interface and interfaces for call control. It also provides turret 114 with key networking services such as DHCP (Dynamic Host Configuration Protocol). Switch 106 may also be coupled to a private telephone switch (PBX) 110 that provides local switching features. PBX 110 may also use proprietary digital line protocols.

Network 118 connects turret 114 and other system 100 components. The primary role of the network is to provide voice data call control between switch 106 and turret 114. The network configuration also can be configured to allow the components of system 100 to be deployed on a customer supplied network having network devices other than those shown in system 100 of FIG. 1.

A call logger 108 is utilized to record multiple audio channels (e.g., 120 audio channels) carrying voice communications through different types of media including analog, digital, private line, ISDN, DS-1, VOIP and the like. Enterprise administration server (EAS) 102 provides a browser-based administration tool, along with a platform to support remote, multi-site administration of system center 104. The key functionalities of the EAS include: 1) turret redirection (e.g., automatic switch and card failover); 2) turret database synchronization; 3) turret database translation; and 4) global free seating.

System 100 also includes a PC-based turret 116 which can be used to provide a visual representation of what is on turret 114. In addition, system 100 also includes a trade central server 120 is a computer telephony integration (CTI) switch that allows interactions on the switch 106 (e.g., telephony service) and a computer to be integrated or coordinated. Trade central server 120 also integrates customer contact channels (e.g., voice, email, web, fax, etc.) with the computer systems in communication with network 118.

A DHCP server (not shown) is utilized to automatically assign IP network addresses to turrets on system 100. The DHCP server is software that may operate on system center 104 or switch 106. Alternatively, the DHCP server may be provided by the customer. In enterprise configurations, a DHCP server is provided by the customer or is embedded in the customer's network fabric switches and routers.

The DHCP server also provides DHCP services to clients (e.g. turret 114). One of the DHCP server's main services is turret configuration. In smaller configurations, a single DHCP server may be used to support many turrets, while larger networks may use multiple DHCP servers.

DHCP servers are the owners of addresses used by all DHCP clients (e.g. turrets 114). The server stores and manages addresses, keeping track of which addresses have been allocated and which are still available.

DHCP servers also use leases to dynamically allocate addresses to clients for a limited time. The DHCP server maintains information about each of the leases it has granted to turret 114 and other DHCP clients, as well as policy information such as lease lengths.

DHCP servers also store and maintain other parameters that are intended to be sent to clients when requested, such as configuration values that specify operational details about individual turrets. In addition, DHCP servers respond to different types of requests from clients to implement the DHCP communication protocol. Such requests include assigning addresses, conveying configuration parameters and granting, renewing or terminating leases.

To support the above, the DHCP server allows administrators to enter, view, change and analyze addresses, leases, parameters and all other information for the DHCP server and the information provided to the DHCP clients.

Figure 2:
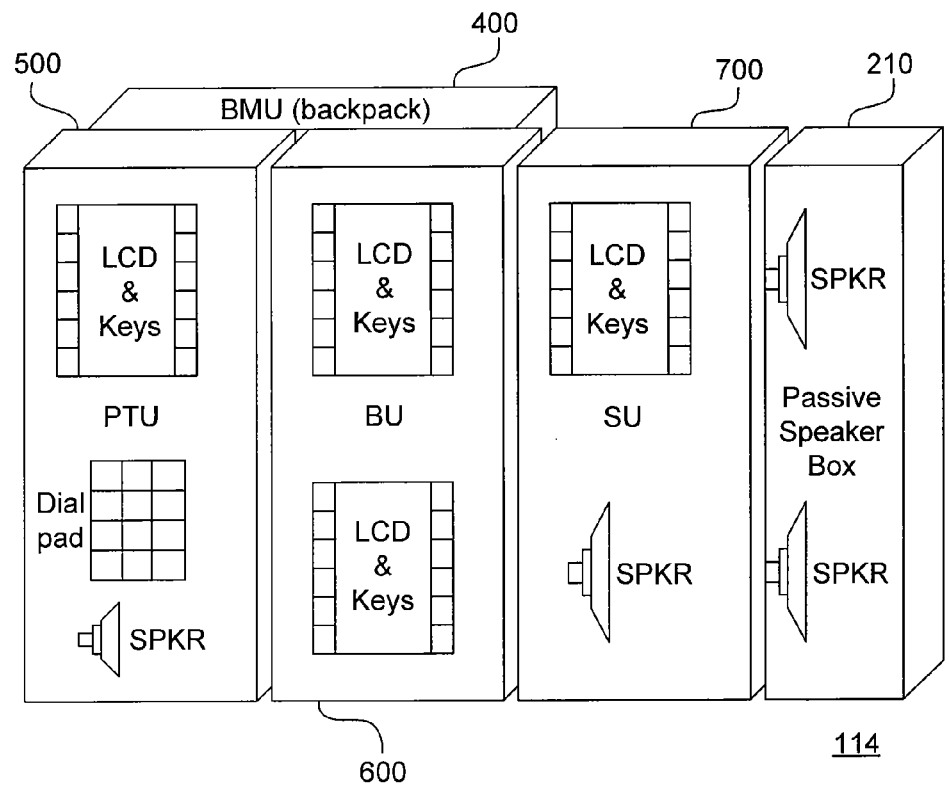
FIG. 2 is a diagram of an exemplary desktop configuration of a turret in accordance with an embodiment of the present invention.

FIG. 2 is a diagram of an exemplary desktop configuration of a turret 114 in accordance with an embodiment of the present invention. Generally, turret 114 includes four main components, a backpack main unit (BMU) 400, primary tactile unit (PTU) 500, a button unit (BU) 600, and a speaker unit (SU) 700. A passive speaker box 210 includes speakers and associated circuitry. Passive speaker box 210 may also be integrated as part of SU 700. In one embodiment, BMU 400 attaches to the back of two other modules, PTU 500 and BU 600, as shown in FIG. 2. All of the units may be physically separated on a desktop or joined together as a single unit. In addition, there is no hardware limitation to the order in which the modules can be arranged. For example, the hardware architecture allows BMU 400 to attach to the rear of PTU 500 and SU 700 as well.

Figure 4:
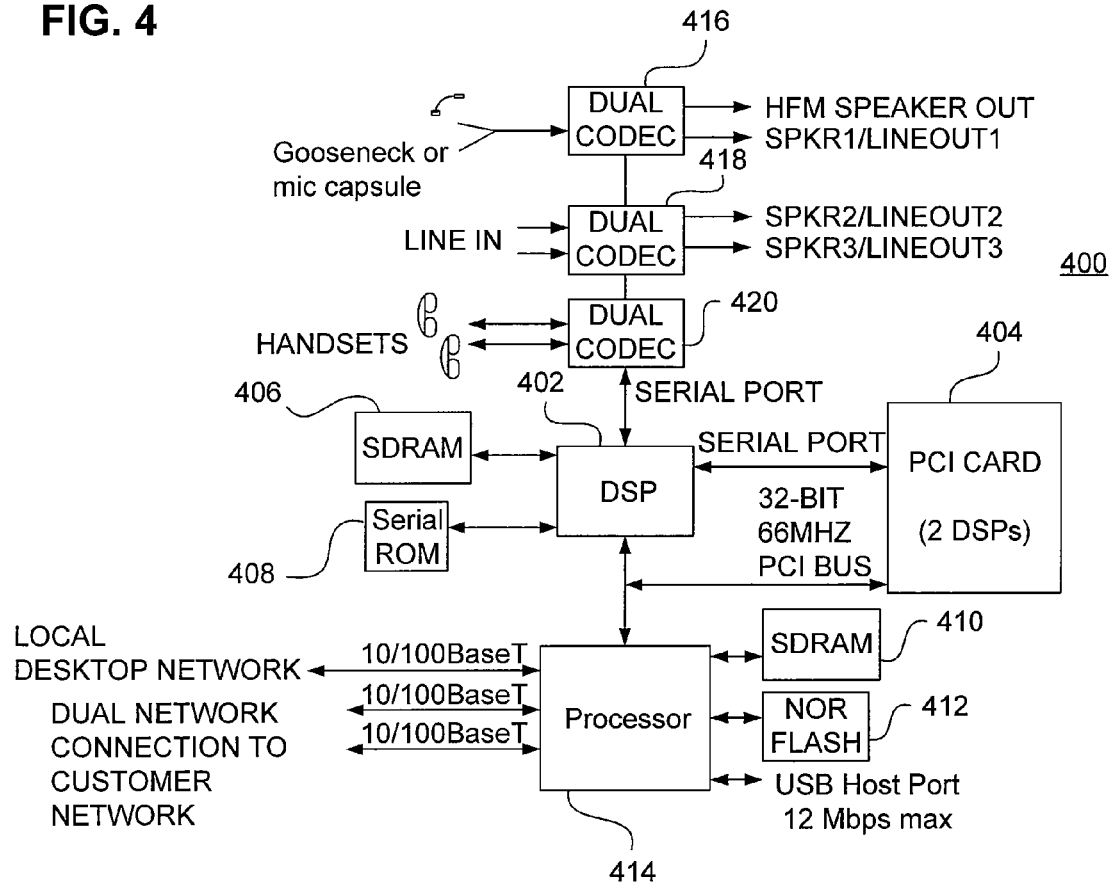
FIG. 4 is a block diagram of a backpack main unit in accordance with an embodiment of the present invention.

FIG. 4 is a block diagram of a backpack main unit (BMU) 400 in accordance with an embodiment of the present invention. BMU 400 includes a main board and an optional DSP daughter card (not shown) all contained within a single plastic enclosure.

A processor 414 in BMU 400 functions as a high performance general purpose communications controller that is capable of processing several independent real-time-protocol (RTP) streams (e.g., 26 independent RTP streams). As shown in FIG. 4, processor 414 further allows for the implementation of 10/100 BaseT Ethernet MACs (Media Access Controllers) for a redundant network connection to a customer's network, and a third 10/100 BaseT Ethernet MAC for a local desktop network. A local desktop network is the data interface between modules. Processor 414 also provides a USB 2.0 host interface for low and full speed third party peripherals and a high bandwidth interface to a digital signal processor (DSP) 402 for voice traffic.

Processor 414 also has a SDRAM 410. Processor 414 also has access to non-volatile flash memory, NOR Flash 412, which is used to store the OS (Operating System) images for all of the processors on the desktop. Processor 414 also has access to its own writable non-volatile serial ROM (not shown).

10/100BaseT Ethernet connections also are provided for interfacing to a customer's network. Only one of the network connections needs to be active at any given time. If one network connection goes down, the other is available to take over.

All of the modules (e.g., BMU 400, PTU 500, BU 600, SU 700) on a given desktop can be connected to a 10/100 BaseT Ethernet network that is limited to that local desktop area. This local desktop network is not visible from a customer's network and is used for data only (e.g., button presses, display updates, etc.). DSP 402 also handles all digital signal processing tasks for the entire desktop. A PCI bus functions as the primary interface between processor 414 and DSP 402 for all voice packets. DSP 402 has its own bank of synchronous dynamic RAM (SDRAM) 406. Every DSP 402 has access to its own writable non-volatile serial ROM 408 to store miscellaneous parameters (PCI configuration values, card type, revision, etc.). DSP may also include SRAM. DSP memory is used, in part, to support a speaker replay function described in more detail below.

All desktop voice traffic is contained within BMU 400, except for the analog connections to the transducers (e.g., microphones, speakers and handsets). Processor 414 forwards incoming voice payloads from the network 118 to DSP 402 over the PCI bus which in turn processes it and forwards it to CODECs (416, 418, 420) (encoder A/D, and decoder D/A) via a serial port. Outgoing voice traffic originating from the handsets and the microphone is formatted by DSP 402 and forwarded over the PCI bus to processor 414 for transmission over the network 118.

Independent CODECs (416, 418 and 420) interface to all of the transducer elements (e.g., handset(s), microphone(s), speaker(s), speaker modules). CODECs (416, 418 and 420) are capable of wideband audio. Wideband audio in the context of the present invention means a predetermined sampling rate (e.g., 8-16 kHz). Wideband audio can be limited to calls that do not go through switch 106 or the public telephone network 110 (e.g., pure IP station to station calls).

BMU 400 can also include an optional PCI daughter card 404 including additional DSPs and associated memory. The two additional DSPs can be used, for example, to offload compression for IP recording and encryption tasks that cannot be handled on the single DSP 402.

As shown in FIG. 4, CODEC 420 supports handsets, CODEC 416 supports a microphone, an 8 channel speaker (SPKR1/LINEOUT1) and a hands free (HFM) speaker output. And CODEC 418 supports two 8 channel speakers. CODEC 418 also provides a line input connector. This allows the customer to connect audio from their PC's sound card to speakers. One or more speakers may also be located within the PTU 500.

BMU 400 sources the analog audio for all speaker modules and for the speaker in the PTU 500. A single twisted pair feeds the summation of all channels required at any given time (e.g., BMU 400 to SU 700) for each SU 700. Each PTU 500 or SU 700 provides its own Class D amplifier to actually drive the physical speaker cone.

The present invention further provides a user selectable "push to cut" or "push to talk" using a six wire interface. One of the wire pairs connects to a general purpose I/O pin on processor 414 through an opto-isolator which can be programmed to do any generic function as well (such as "push to signal").

In one embodiment, the present invention includes a handset with a thumbwheel device and multiple buttons that have an effect on a PTU display and allow a user to control application. The thumbwheel function can be supported via the USB host port through processor 414.

If analog recording is required, a USB D/A box can be plugged into the USB host port connected to processor 414. Wireless (e.g., Bluetooth) handsets and headsets can also interface through the standard analog handset interface and/or to the USB host port. The USB port also can be used to support devices such as thumb print recognition or as a general purpose I/O. A USB camera can also be used through the USB host port.

Figure 5:
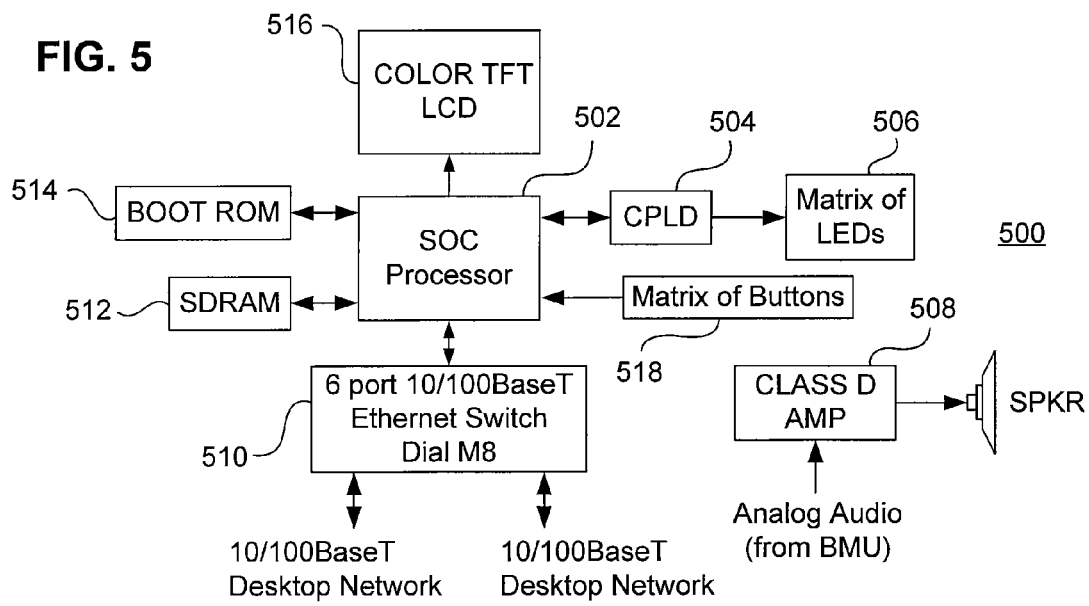
FIG. 5 is a block diagram of a primary tactile unit in accordance with an embodiment of the present invention.

FIG. 5 is a block diagram of a primary tactile unit (PTU) 500 in accordance with an embodiment of the present invention. As described above with reference to FIG. 2, PTU 500 is present on the desktop along with BMU 400 and at least one other module (BU 600 or SU 700).

The hardware architecture of the PTU is very similar to that of the BU 600 and SU 700. Accordingly, the following description applies to each of the three modules (PTU 500, BU 600, SU 700).

PTU 500 includes a color TFT (thin film transistor) LCD (liquid crystal display) 516. The same LCD type display is included in BU 600 and SU 700 (depicted as 604*a*, 604*b* and 704 in FIGS. 6 and 7, respectively). LCD 516 is controlled by an SOC (System On a Chip) processor 502 which includes a built-in display controller. A display buffer or video memory for the LCD 516 is implemented in SDRAM 512 and controlled by the SOC processor 502.

SOC processor 502 has access to a non-volatile writeable serial memory (BOOT ROM) 514 for storing a boot loader for its operating system. SOC processor 502 also functions as a button scanner to scan a matrix of buttons 518 on the front of the module. The button scan logic is implemented in hardware within the SOC 502 processor. SOC 502 processor interfaces to a CPLD (Complex Programmable Logic Device) 504 which utilizes logic to scan a matrix of LEDs on the front of the PTU 500 module. SOC processor 502 also interfaces directly to an Ethernet switch device 510 on the local desktop network.

PTU 500 (like the BU 600 and SU 700) has two external 10/100BaseT network ports to interface to the local desktop network. Each of these network ports terminate to a 10/100BaseT Ethernet switch device port in the module forming a true local area network including the physical desktop area. Ethernet switch 510 enables communication of data packets (e.g., button presses, display updates, etc.) between BMU 400 and the SOCs on other modules (e.g. BU 600, SU 700).

The PTU 500 (like the BU 600 and SU 700) utilizes a unique hardwire identifier for each SOC processor LCD display combination. In one embodiment, a 16-position switch (not shown), which is readable by each SOC processor is used for this purpose. The 16 position switch can also be made accessible from the outside of each module.

The PTU 500 (and SU 700) also includes a Class D switching power amplifier 508 to drive a speaker (SPKR). The PTU speaker provides functions including hands free functions and ringer functions. The analog input to the power amplifier 508 comes directly from one of the BMV 400 CODECs (416, 418 or 420). This analog signal is AC coupled and balanced to minimize noise pickup across the desktop. The connection between amplifier 508 and the physical speaker cone is made accessible to the outside such that a passive speaker box can be substituted for the internal speaker cone, if necessary. The amplifier can operate at a fixed gain, and DSP 402 in BMU 400 controls the input signal level to amplifier 500. SOC processor 502 also controls the muting of amplifier 508.

Figure 6:
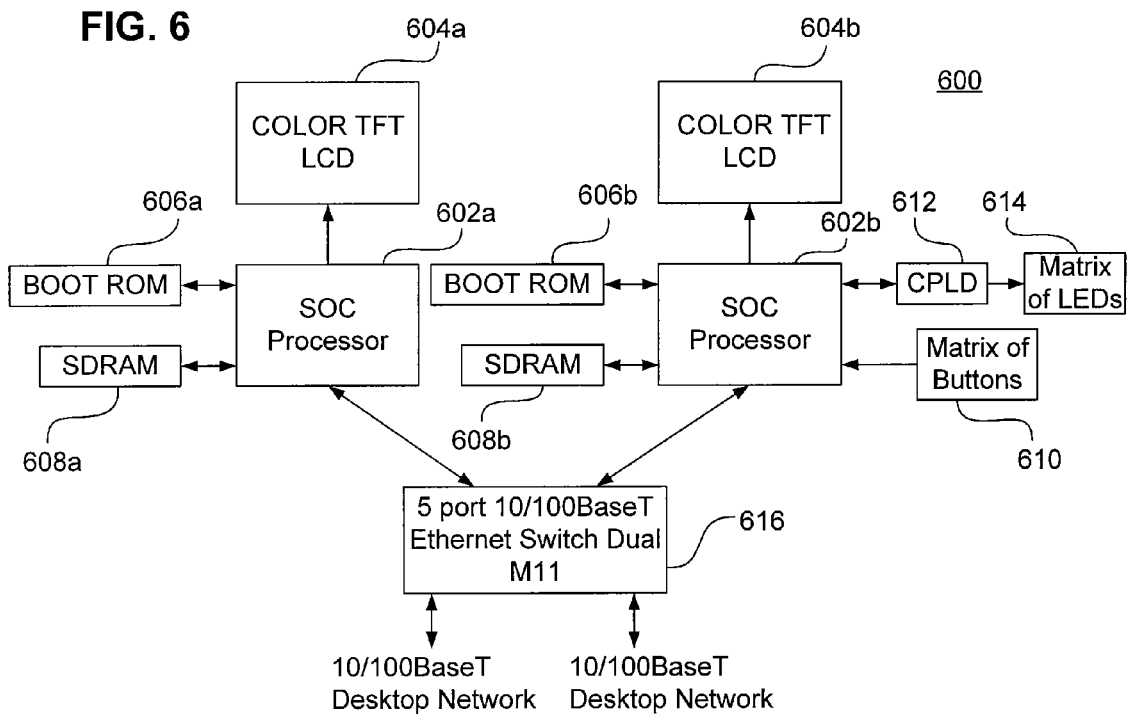
FIG. 6 is a block diagram of a button unit in accordance with an embodiment of the present invention.

FIG. 6 is a block diagram of a button unit (BU) 600 in accordance with an embodiment of the present invention. BU 600 includes TFT LCD displays 604*a*, 604*b* such as those described above with respect to PTU 500. Each display is respectively driven by a display controller which is integrated as part of a SOC processors 602*a*, 602*b*. The display memory for the color displays are implemented in SDRAMs 608*a*, 608*b* and controlled by SOCs 602*a*, 602*b*, respectively. SOC processor 602*b* also functions as a button scanner to scan a matrix of buttons 610. A CPLD (Complex Programmable Logic Device) 612 includes logic operable to scan a matrix of LEDs 614.

BU 600 includes external 10/100BaseT network ports to interface to the desktop network. Each of these network ports terminates to a 10/100BaseT Ethernet switch chip port 616 in the BU 600. As described above, Ethernet switch 616 enables communication of data packets to and from the BMU 400 and the SOC processors on other modules. ROMs 606*a*, 606*b* contain initialization data and start-up routines.

Figure 7:
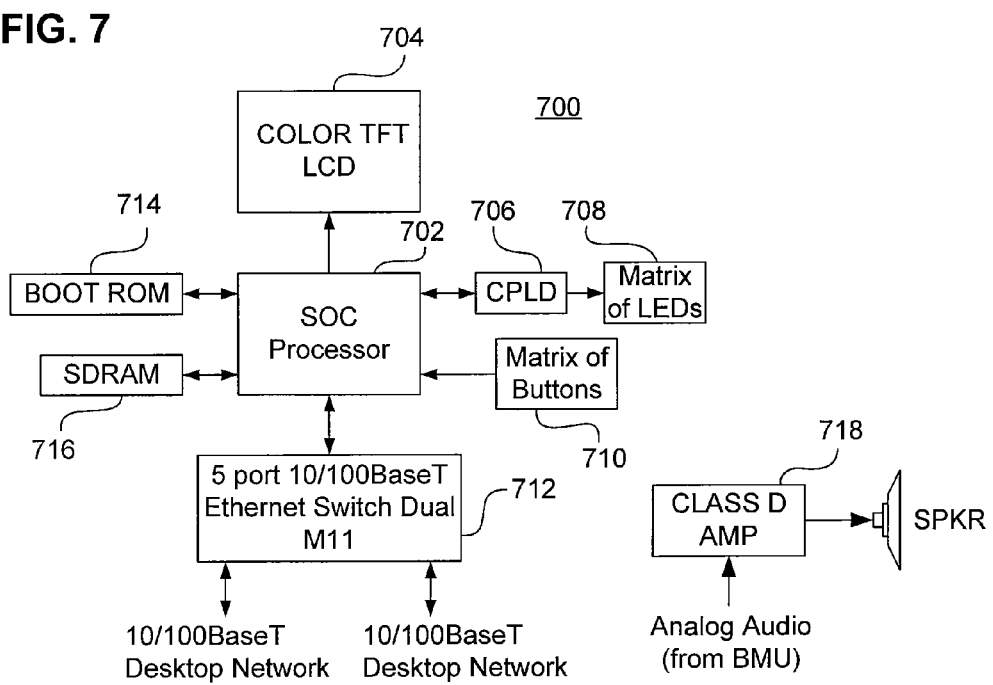
FIG. 7 is a block diagram of a speaker unit in accordance with an embodiment of the present invention.

FIG. 7 is a block diagram of a speaker unit (SU) 700 in accordance with an embodiment of the present invention. As shown, the block diagram of the SU 700 is identical to the PTU 500. SU 700 includes a TFT LCD 704. The display is driven by a display controller which is integrated as part of a SOC processor 702. The display buffer or video memory for LCD 704 is implemented in SDRAM 716 and controlled by SOC processor 702. SOC processor 702 also functions as a button scanner to scan a matrix of buttons 710 which is implemented by hardware within the SOC processor 702. The CPLD 706 utilizes logic to scan a matrix of LEDs 708.

A Class D power amplifier 718 is also included in SU 700 to drive a speaker (SPKR). The analog input to the power amplifier will come from one of the CODECs on the BMU 400 and is a balanced differential signal capable of minimizing noise pickup across the desktop.

SU 700 further includes two external 10/100BaseT network ports to interface to the desktop network. Each of these network ports terminates to a 10/100BaseT Ethernet switch chip port 712 in the SU 700. Ethernet switch 712 enables communication of data packets to and from the BMU 400 and the SOCs on other modules. BOOT ROM 714 is also included for storing initialization data startup routines.

Figure 3:
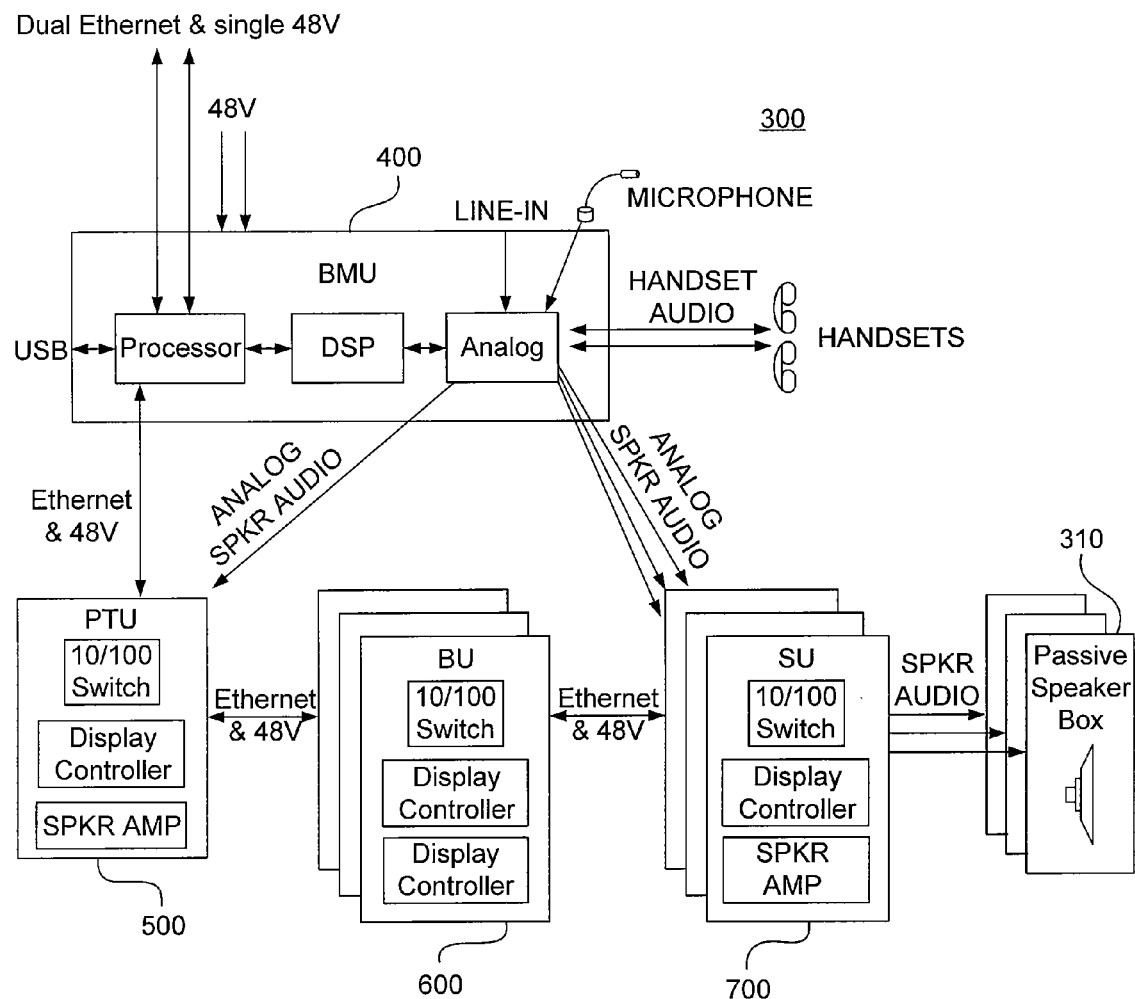
FIG. 3 is a block diagram and cabling overview in accordance with an embodiment of the present invention.

FIG. 3 is a block diagram and cabling overview in accordance with an embodiment of the present invention. As shown, each SU 700 forms one link in a daisy chain of data and power between all modules. Each BU 600 forms one link in a daisy chain of data and power between all modules. Also shown is the power configuration of an exemplary embodiment of the present invention.

The following description describes the basic operations of the turret 114 in the telephony system 100. Turret 114 can be configured in manufacturing to contain all of the software required to operate in a telephony system 100. The turret's configuration can also be retrieved at the customer's site from through the telephony system 100.

When new software is made available for the turret due to a feature enhancement or regular product maintenance, the turret can automatically load, persistently store and then execute the new software.

A description of the initialization modes in accordance with the present invention will now be described in more detail. The turret system initialization occurs in 4 phases: 1) establish network addressing via DHCP (option); 2) validate initial turret software image; 3) obtain the switch information to connect; and 4) establish connectivity through switch 106.

System 100 supports multiple systems configurations. The presence of two components, DHCP on the telephony switch and the enterprise administration server (EAS), affects the power-on operation of turret 114. Additionally, in enterprise configurations, the DHCP server may be provided by services in the customer network.

Different configuration options affect the turret power-on operation. Generally, these configuration options can be categorized into three classes: 1) the turret network TNC is statically configured; 2) the turret network TNC is dynamically configured via a DHCP server; or 3) the turret uses the enterprise administration server (EAS) that supplies the turret with switch connectivity information.

Any initialization failure can be logged by the switch. Switch 106 is provisioned for specified turrets on specific switch ports. If a turret is not properly connected to switch 106, it will generate a log message that the turret is not connected.

In the event of software updates, administration or technical support operations, turret 114 supports the capability to be remotely rebooted by the system center 104. Turret remote reboot uses a secure shell (SSH) terminal session to execute the reboot command. Each time turret 114 is rebooted, the operation is logged using the logging service resident on system center 104. The remote reboot processing occurs in four steps: 1) establish a secure shell session; 2) send a reboot command to the turret 114; 3) execute a reboot command on the turret 114; and 4) record the remote reboot command on system center 104.

Trader login on turret 114 is separate from the ability for a trader to login to switch 106. The trader can login to the turret if the network connection to the switch 106 is non-existent, marginalized or severed. Thus, two logins are available: 1) the station (turret) logon; and 2) the switch 106 logon. Trader logon to turret 114 provides the trader with access to turret preferences and administration operations in the event of loss of switch connectivity. The logon operation for traders only authorizes the trader at turret 114. Trader preferences are loaded by a session manager software module after a successful logon.

A trader can perform a logoff operation at the turret 114. A "LOGOUT" button is available to initiate this operation. The trader logout operation can be prevented if the trader has any active calls. In addition, any such LOGOUT operation is recorded by system center 104. No other information is persisted to any other telephony system 100 components during the LOGOUT operation.

As described above turret 114 is a desktop telephone platform designed for the trader and exchange floor trading applications. Unlike other phone systems, the turret's user can simultaneously listen to several line calls. The voice data of seized calls are concurrently heard on the turret's speaker.

The turret 114 in accordance with the present invention contains a high speed digital signal processor (DSP) that provides the capability to combine voice data from multiple calls to the speaker. The voice data presented to the DSP is in digital format which can be any well-known or proprietary digital audio format. The turret 114 can support multiple (e.g., 3) speaker units and each speaker can support multiple (e.g., 8, 12, 16, 24, etc.) audio channels derived from active calls. Those skilled in the art will recognized that a speaker capable of providing audio for all 24 channels would still be within the scope of the invention.

In one embodiment, intercom and internal calls are heard only on the PTU 500 hands free speaker or handsets.

Time synchronization in the telephony system 100 ensures accurate time keeping for events, logging of system operations as well as the date and time presented on the turret displays. In one embodiment of the present invention, the turret uses the industry standard network time protocol (NTP) for time synchronization. Each turret's NTP operations conform to RFC-1305 (Network Time Protocol), hereby incorporated herein by reference in its entirety, for network time protocol.

In enterprise network configurations, the customer's network provides the NTP time reference server. When telephony system 100 is deployed with a canned network, the system center 104 serves as the primary NTP reference server for the turrets 114.

System center 104 can be configured to utilize other NTP time reference servers as references to establish accurate time for each of the system centers 104.

If system 100 is configured with more than one system center 104, multiple system centers 104 can be used by the turrets 114 to establish accurate time. The turrets 114 are capable of using NTP servers and national time standards other than systems centers 104 to improve time synchronization accuracy. In addition, each turret 114 need not use other turrets as a reference to synchronize time.

System center 104 records events relevant to the operation and administration of the telephony system 100. There are several types and levels of events that are generated by the telephony system 100 and recorded by the system center 104.

System center 104 also provides support for the UNIX syslog event logging system. Critical events that occur on turret 114 that require recording are forwarded by it to the system center 104. Alternatively, an optional logging server can be substituted for the logging services provided by the system center 104. Detailed event logs can be obtained from turret 114 by either copying the syslog log file via a secure file transfer protocol or inspecting the log file via the SSH secure console connection, or other secure file transfer protocol such as SFTP, WGET over HTTPS and the like.

Referring again to FIG. 1 network management system 112 is used to monitor and manage the health and availability of the turret's applications. Network management system 112 also collects and retains data about system hardware, voice performance and network operations. Although Simple Network Management Protocol (SNMP) is supported internally to the turret, support for external network management systems is also available.

SNMP performs management services by using a distributed architecture of management systems and agents. Network management system 112 is utilized for both auditing and resource management. In particular, SNMP is used to provide: 1) voice information; 2) configuration information; 3) inventory information; 4) turret status information; and 5) standard MIB-2 information, each of which will now be described in more detail.

The voice information is predetermined SNMP information defined for the turrets 114. The information tracks the voice channel bandwidth, bandwidth utilization, burst metrics (e.g., gap density and duration, burst density and duration, and the like), packet loss and discard, jitter and delays as well as memory and CPU utilization.

The configuration information is predetermined SNMP information defined for the turrets 114. The station information tracked includes information such as: LAC, location, station card information, time and NTP information, and the like. The information also tracks module information including: serial numbers, manufacture dates, boot ROM versions, kernel version, and the like. In addition, the information tracks the current operation status of the turret including: login status, active trader ID (TRID), login failures, and the like.

The software architecture in accordance with the present invention provides an infrastructure to execute applications in a distributed, multi-CPU environment interconnected though a private IP network.

Figure 8:
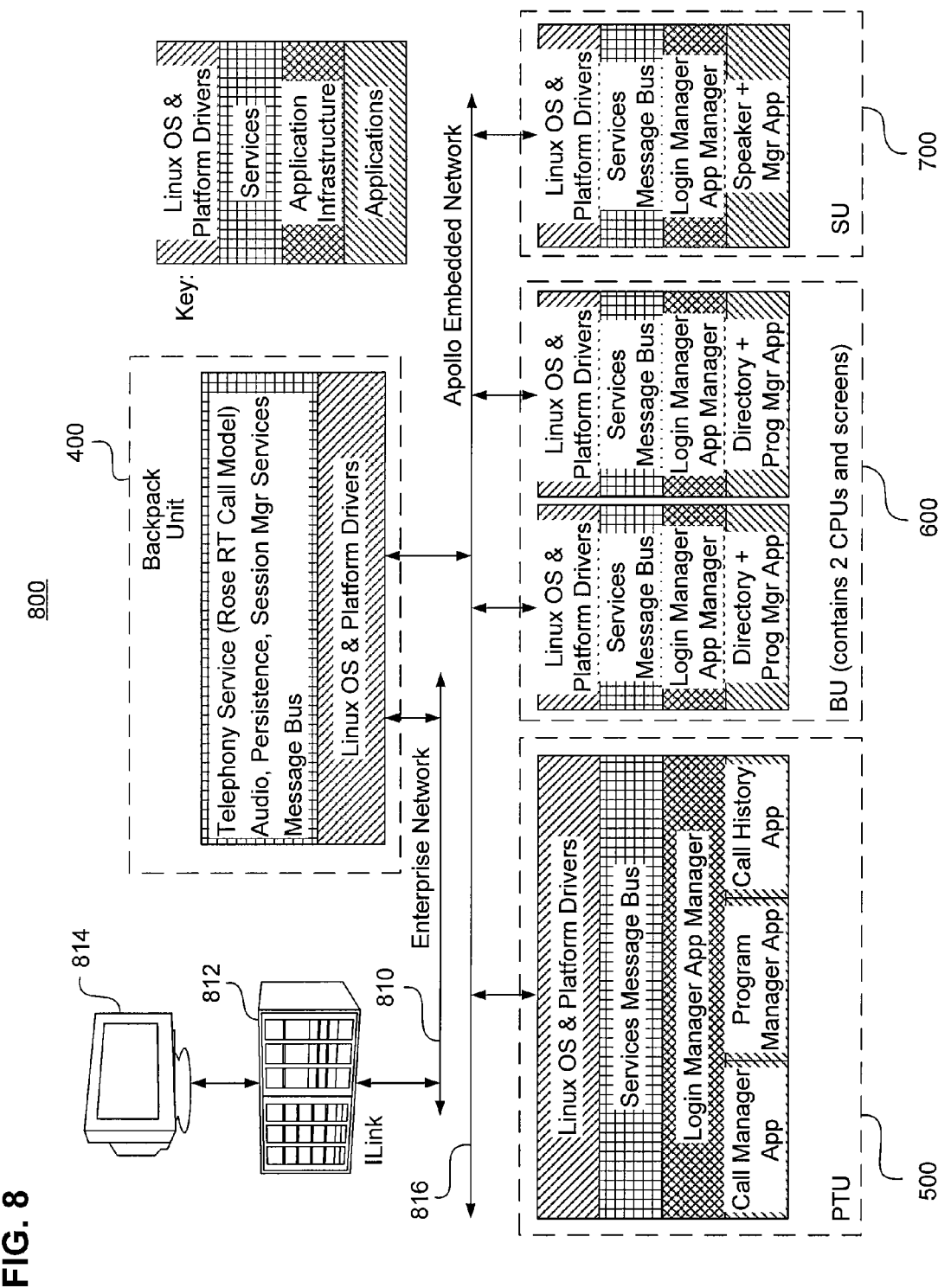
FIG. 8 is a block diagram of a software architecture in accordance with an embodiment of the present invention.

FIG. 8 is a block diagram of a software architecture in accordance with an embodiment of the present invention. The software architecture of the present invention enhances the user interface, provides more sophisticated and flexible internationalization, and provides a call history and contact directories. In addition, the present invention utilizes a hardened network platform that significantly improves network security.

The software architecture of the present invention is modeled to provide a distributed environment for different applications. This architecture is organized into five functional subsystems that comprise the larger system: 1) operating system; 2) platform drivers; 3) applications; 4) application infrastructure; and 5) services.

In one embodiment, the operating system (OS) is the Linux OS. The OS and platform drivers contain the real-time operating system and OS facilities including networking services, administrative consoles and real-time performance.

An exemplary operating system layer in accordance with the present invention will now be described in more detail. The operating system layer provides the base software infrastructure to build the software services, applications and provide the ability to control the platform hardware. The operating system layer is subdivided into three areas: 1) a real-time Linux operating system; 2) platform drivers; and 3) communication libraries.

The real-time Linux operating system (Linux RTOS) adds real-time execution capabilities for supporting telephonic voice and audio services; call and intercom control; and highly responsive button, video displays and LED scanning.

In one embodiment of the present invention, the hardware architecture deploys two different CPUs on two different circuit cards—one for the BMU 400 and another for the PTU 500, BUs 600, and SUs 700, where each processor executes independent versions of the Linux kernel.

Although there are differences between the processors, the Linux RTOS can use the same OS architecture for each unit hardware platform. Differences between the hardware platforms are supported by Linux device drivers and other Linux facilities.

The Linux operating system is composed of four major subsystems: 1) user applications—the area where directories, voice mail and call history applications execute; 2) O/S Services—these are services that are typically considered part of the operating system and execute in the same Linux space as applications. Services executed include: a QT windowing system, a message bus, button and LED services, an SNMP agent core, NFS servers, SSH, etc.; 3) Linux Kernel—the kernel abstracts and mediates access to the hardware resources, including the processor, and schedules software tasks for execution. 4) Platform Hardware—this subsystem is comprised of all the possible physical devices and controllers including memory, CPU, network, DSPs, buttons, LEDs, displays and switches.

This architectural diagram follows Layered style described in the publication by David Garlan and Mary Shaw, entitled "An Introduction to Software Architecture, Advances in Software Engineering and Knowledge Engineering", Volume I, World Scientific Publishing Company, 1993, incorporated herein in it is entirety. In general, each subsystem layer can only communicate with the subsystem layers that are immediately adjacent to it. Dependencies between subsystems are from the top down: layers pictured near the top depend on lower layers, but subsystems nearer the bottom do not depend on higher layers.

Real-time operating systems support application and service that are executed in a deterministic, real-time manner. In an exemplary embodiment, real-time kernel patches deliver features for tasking, interrupt handling and communication with Linux. The normal Linux kernel operations and application tasks are suspended while the sub-kernel's tasks run or while the sub-kernel is dealing with an interrupt.

A platform driver architecture provides the operating infrastructure for the station and platform Service layers. The platform driver architecture includes the operating system common device interfaces like networking and the real time clock.

Applications provide the business logic that controls the turret and trader information. The core functions of the present invention are organized around telephony, audio and persistence services that run on the BMU 400. The applications supported are the directory, call manager, voice mail, speakers, program manager and call history. More particularly, applications are software modules that execute in the software architecture's application layer on the turret's hardware. Applications provide the logic that receives trader inputs and translates them into actions that control system 100 components. The applications are directly responsible for presenting application information to the trader. Although the primary software interface to the turret's function reside in the applications, much of the core logic resides in the services e.g., telephony.

The application infrastructure layer provides the control and configuration logic for applications. The control includes execution and configuration of the applications with trader specific data. More particularly, the application infrastructure layer refers to the portion of the software architecture that provides the execution environment for applications. The application infrastructure layer also provides access and connectivity to facilities and services in the telephony system as well as specific application preferences and configurations of the logged-in user.

Services are the portion of the software architecture that provides applications that control the turret hardware and telephony actions. Services provide a fully abstracted interface for applications to the platform hardware drivers and telephony capabilities and are available through formal APIs via the message bus. Services are divided into two general areas of responsibilities, station services and platform services.

Station services are responsible for telephony actions, information and control layer provides access and connectivity to facilities and services in the turret hardware. Station services provided include: audio service; telephony service; and data persistence service. Platform services control hardware outside the responsibilities of telephony, and include a button service; a LED service; and an equipment management service.

The front panel button hardware driver provides access to the state of the turret 114 front panel buttons. The driver is a software module operating in the Linux OS kernel. The driver interface generates events used to invoke reset button state change handler. Once a front panel button is pressed, the state of the button is retained (sticky key) until the button state is cleared through the execution of a clear button state operation.

The button hardware driver operations include: Get Button State, which returns the state of the front panel button as a count; and Clear Button State, which sets the state of the front panel button as a count of zero (0). In an exemplary embodiment, this button service is implemented as a kernel device driver.

A front panel LED hardware driver provides access to turret 114 front panel LED states. The driver is a software module operating in the Linux operating system kernel. In an embodiment of the present invention, LEDs are 3 color LEDs (e.g., RED, GREEN, BLUE and WHITE) with 4 operating modes: OFF, ON, BLINK FAST and BLINK SLOW. The interface permits the settings of LED's color and operating mode for a single LED or a multiple LEDs in a list.

The LED hardware driver operations include: Get LED State, which returns the state of the front panel LED; and Set LED State, which sets the state of one or more the front panel LEDs. In an embodiment of the present invention, the LED service is implemented as a kernel device driver.

A speaker mute control controls whether the speakers produce audio and operates independently of any volume controls in turret 114. The driver is a software module that operates in the Linux operating kernel and controls the electronic gain control of the speaker's amplifier circuit. Changes to the mute state do not affect level or settings of the speaker's volume control. The speaker mute control driver includes support for the following operations: Mute Speaker Enable, which prevents audio on speaker; Mute Speaker Disable, which permits audio on speaker; and Mute Speaker Status, which returns the current mute state.

A backlight control driver is a hardware driver that is, in part, included in the Linux OS's video frame buffer device driver. The driver controls the brightness of the turret 114 graphical display. The backlight control service interface provides support for the following operations: Get Backlight Level, which returns the current level of the display backlight; and Set Backlight Level, which sets the current level of the display backlight. The backlight control interface is available in all the display units including the PTU 500, BU 600, and SU 700.

A digital signal processing (DSP) driver provides control and a high speed data path to the DSP in accordance with the present invention. The driver is a software module that operates in the Linux OS kernel. The DSP driver can execute on the BMU 400, where the DSP hardware is physically located.

In one embodiment of the present invention, communication interfaces between the DSPs and other software include an interface for an audio service and a control and voice data path for the telephony services. The audio service supplies an associated API for applications such as the speaker applications.

Voice data is formed in class-of-service (COS) transport data packets and moved directly into the DSP's physical memory space. Optionally, the audio service interfaces to the DSP driver.

A reset button hardware driver provides access to the state of a reset button on turret 114. The driver is a software module operating in the Linux OS kernel. The driver interface generates events used to invoke reset button state change handler. Once the reset button is pressed, the state of the button is retained (sticky key) until the button state is cleared through the execution of the clear button state operation.

In an exemplary embodiment of the present invention, the reset button service interface supports two operations: Get Button State, which returns the state of the reset button as a count; and Clear Button State, which sets the state of the reset button as a count of zero (0). This service can be implemented as a device driver.

A unit identity driver provides access to the state of each turret unit's identity switch. The driver is a software module operating in the Linux OS kernel. A turret unit's identity is set when the turret is assembled and configured. A unit's identity switch is representative of the unit's logical position with respect to the turret software. The turret units can be placed in any physical order and configuration. As described above, each turret unit's identity switch has a unique setting. If a turret contains two SOC CPUs, for example, each CPU will have a unique identifier derived from the turret unit identity switch and the CPU position on the unit's circuit card.

The unit identity service interface supports operations including: Get Unit Identity, which returns the unit identity of the CPU. This service can be implemented as a device driver.

The present invention utilizes a secure shell (SSH) protocol to provide authentication, encryption and data integrity to secure network communications. In particular, SSH is utilized to provide a secure command-shell, secure file transfer, and remote access to a variety of TCP/IP applications via a secure tunnel (e.g., port forwarding).

An OS subsystem of the present invention provides several communication libraries to other libraries, services and applications. The communication libraries rely on the IP networking services provided by the Linux OS platform. Each communication library provides a unique interface specific to capabilities of the service. The following communication protocols are supported: COS (transport), I-Link Messaging (call control), IPC RTP (for voice traffic), message bus (for APIs), and D-Link Messaging.

A message bus (ccBus) is the primary messaging mechanism between applications and services. The ccBus provides the ability for applications and services to send messages to other applications and services. Each unit receives all messages sent on the message bus and each application and service is independently responsible for processing messages.

The ccBus supports both broadcast and multicast network addressing. These capabilities allow messages to be delivered to all turret units. Multicast addressing allows messages to be sent on topic specific ports. Topic ports assign application and service specific messages to a specific communication socket. Only applications and services that registered to send and receive on those ports have visibility to the messages.

Command shells such as those available in Linux and Unix, provide the ability to execute programs and other commands, usually with character output. A secure command-shell or remote logon allows file editing, viewing the contents of directories and access to custom database applications. Administrators can remotely start batch jobs, start, view or stop services and applications, create user accounts, change permissions to files and directories as well as man other operations.

Port forwarding provides security to TCP/IP applications including messaging, database access, and applications. Port forwarding, also referred to as tunneling, allows data from normally unsecured TCP/IP applications to be secured. After port forwarding has been set up, SSH reroutes traffic from a program (usually a client) and sends it across the encrypted tunnel, then delivers it to a program on the other side (usually a server). Multiple applications can transmit data over a single multiplexed channel, eliminating the need to open additional vulnerable ports.

Secure file transfer provides the capability for other components or turret administration and support workstations to securely transfer data to and from the turret. One exemplary secure file transfer protocol is the Secure File Transfer Protocol (SFTP). In essence, it is a separate protocol layered over the Secure Shell protocol to handle file transfers. SFTP encrypts both usernames/passwords and the data being transferred. It uses the same port as the Secure Shell server, eliminating the need to open another port. Another exemplary secure file transfer application is WGET with HTTPS.

The present invention further includes a syslog system configured to maintain a log of events that occur in the operating system and applications on each turret unit. Turret units maintain individual logs of events that occur on the unit. The PTU 500, BUs 600 and SUs 700 forward critical errors to the BMU 400.

Critical events occurring on turret 114 are forwarded to the system center 104 by the BMU 400 for permanent recording as well as being persisted on the BMU 400. The system center 104 provides support for the Unix syslog event logging system. Such critical events can be forwarded to a predetermined destination configured during the turret's power on initialization.

System center 104 can also request logged events from the turret's BMU 400 over the enterprise network.

Syslog organizes event sources into events and event into distinct categories: facility and level. The facility is the application or operating system component that generates a log message. The level is the severity or significance of the message which has been generated. The action defines what is done with any newly-arrived message that matches the facility and level. This combination of facility and level, referred to as the selector, allows system administrators to customize message handling, based on which parts of the system are generating data, and the criticality of the data.

Time synchronization of turrets is performed using the Network Time Protocol (NTP) to ensure the time stamps of events, logging of system operations and the date and time. The turret 114 uses the system center(s) 104 as the primary NTP time reference server. The turrets 114 may also use NTP servers other than systems centers 104 to improve time synchronization accuracy.

NTP operates in a master/slave slave configuration, where the master or server provides time information to NTP slaves or clients. The NTP clients receive time information from NTP servers and calculate a weighted average of time.

Each turret 114 has NTP master/server capability. The NTP server receives time information requests from both the enterprise network and the local Ethernet network.

Within the turret 114, each unit of the turret contains a NTP client. The clients on the PTU 500, BU 600 and SU 700 are configured to use the BMU 400 as the reference NTP service.

A Trivial File Transfer Protocol (TFTP) server provides network boot capabilities for the units, excluding the BMU 400. The server makes the operating system kernel boot images available over the local network to the PTU 500, BU 600, and SU 700 boot loader software.

In particular, TFTP is used to read boot image files from the BMU 400. The turret configuration of TFTP permits clients to read files from the BMU 400. It cannot, however, be used to list directories, and has no provisions for user authentication.

The process of transferring a file consists of three main phases. In highly generalized terms, these are: 1) Initial Connection: The TFTP client establishes the connection by sending an initial file read request message (RRQ) to the server. The server responds back with file data packet (DATA) to the client and the connection is effectively opened; 2) Data Transfer: Once the connection is established (the first data packet is sent by the server), the client responds with a data acknowledge message (ACK). The server sends data and the client sends acknowledgments; and 3) Connection Termination: when the last TFTP message containing data less than 512 bytes has been sent and acknowledged, the connection is terminated. If the file data falls on a 512 byte boundary (i.e., the last packet is 512 bytes), a 0 byte data packet is sent by the server and acknowledged by the client.

The Dynamic Host Configuration Protocol (DHCP) client operates as part of the Linux operating system networking capabilities. The DHCP client executes exclusively on the BMU. DHCP client requests will only be transmitted on the enterprise network.

A DHCP server provides configuration parameters specific to the DHCP client host (turret 114). The DHPC client uses this information to configure the network port to operate on the network. The configuration information includes: IP addresses for routers, gateways, domain name servers, network masks and the IP address for the turret's network port. The following description describes the operation of a DHCP client (turret) with a server.

When a turret 114 attaches itself to the network for the first time, it broadcasts a DHCPDISCOVER packet. A DHCP server on the local segment will see the broadcast and return a DHCPOFFER packet that contains an IP address, along with other information. Turret 114 may receive multiple DHCPOFFER packets from any number of servers and chooses between them. Once an offer has been selected, turret 114 then broadcasts a DHCPREQUEST packet that identifies the explicit server and lease offer that it likes the best. This decision may be based on which offer has the longest lease, or which offer provides the most information that the turret needs for optimal operation. The non-chosen servers recognize the explicit DHCPREQUEST packet from the turret and continue normal operations. The chosen server returns a DHCPACK that tells the turret the lease is finalized. If the offer is no longer valid for some reason-perhaps due to a time-out or to another DHCP client allocating the lease-then the selected server must respond with a DHCPNAK message. This causes the turret to send another DHCPDISCOVER packet, starting the process over again.

Once the turret 114 receives a DHCPACK from the DHCP server, all ownership and maintenance of the lease (IP address) is the responsibility of the turret. Turrets can test the addresses that have been offered to them by conducting ARP broadcasts. If another node responds to the ARP, the turret assumes that the offered address is in use. At this point, the client rejects the offer by sending a DHCPDECLINE message to the offering DHCP server; the turret would also send another DHCPDISCOVER packet, thereby starting the process yet again.

Once turret 114 obtains a lease on an IP address, the lease is renewed prior to its expiration date through another DHCPREQUEST message. If a turret 114 finishes using a lease prior to its expiration date, the client may send a DHCPRELEASE message to the DHCP server so that the address can be made available to other DHCP clients. If the DHCP server fails to receive a message from the client by the end of the lease, it marks the lease as expired, and makes the address available for other DHCP clients to use.

A network file system is provided to support the turret PTU 500, BU 600 and SU 700. NFS is the primary protocol to used by the units to download the unit's execution images and store data.

An NFS client permits applications to access file data not resident on the local CPU. In the turret 114, the NFS clients provide the PTU 500, BU 600 and SU 700 with access to data on the turret's BMU 400.

As described above, Station Services include: audio service, telephony service, and data persistence service. Stations Services execute on the BMU 400. The audio services provide features supported by the signal processing hardware that is embedded in the BMU 500. The telephony service is a gateway to switch 106 via the network 118. The data persistence service provides applications and services with trader configured preferences and administrator configured settings.

Applications can send commands and data to station services through an application programming interface (API). The APIs provide functions and data interfaces specific to the station service. Every service API is transmitted to the service via a message bus (ccBus). The services monitor the ccBus for messages to process (execute commands).

The turret audio service provides applications with real-time control of microphones, speakers, and generation of tones and voice from digital data. The audio service also provides the ability to detect dial tone used by the telephony service and the speaker application. More particularly, the service uses WAV files and WAV file data to generate tones of variable duration. The WAV files can also be generated at variable play rates (e.g., 16-128 KB/s). All generated audio, with the exception of playing back recorded voice audio, can be generated for an indefinite time.

The audio service resides and executes on the BMU 400 with the DSP drivers and the telephony service. Applications executing on the other Units interface to the audio service via the message bus and the Audio API layer.

The audio service interfaces directly to the turret DSP 402. DSP 402 is responsible for the calculations and the conversions of digital audio data into analog audio that can be amplified and heard on the speakers and handsets.

Audio service operations and responsibilities include the following:
Audio Playback Request
Audio Channel Level Report
Play Arbitrary File
Load Ringtone
Play Ringtone
Load and Play DTMF Comfort & Confidence Tones
Audio Channel Summing (8 Channels/Speaker)
Independent Speaker Volume Control
Independent Handset and Microphone Gain
Dial Tone Detection
Assign call audio channel to physical speakers.

The audio service implements two communication interfaces between the DSP 402 and other software: an interface for the audio service, and an interface for control and a voice data path for the telephony services. The service is associated with an API for applications such as the speaker application. The interface provides a high speed data packet interface for voice data. Voice data is formed in transport data packets and moved directly into the DSP's physical memory space.

The turret telephony service provides applications with real-time control of calls. More particularly, the service executes the call processing that handles the states and call features and acts as a proxy between telephony aware applications and switch 106.

The telephony service executes exclusively on BMU 400 along with the DSP drivers and the audio service. Telephony aware applications executing on other units interface to the telephony service via the telephony service's APIs marshaled across the message bus.

The turret call processing manages call control messages to and from: the call manager application via the message bus; call processing (e.g., via I-Link™) across the enterprise network; persistent data service via a libdbo library to database on the system center 104; and turret DSPs for audio control and audio tone generation.

In a typical application scenario, a trader input to telephony service is an abstracted logical button identifier sent to the call manager application. The call manager re-forms the logical button identifier into a trader button. The trader button is forwarded to the telephony service to initiate a call or a line to be seized.

There are four major components that make up the turret's call processing. These objects include: CallProc, presentation manager, Button/LED driver and the Button/LED Proxy. These objects are structured to pass messages to and from the call manager application via the message bus and interface (e.g., I-Link™) to switch 106.

A turret proxy provides an interface between the message bus and the presentation manager. The proxy transforms message-bus button messages into acceptable input to the presentation manager. The proxy also accepts lamp on signals and translates them into message-bus LED service messages.

The presentation manager maintains the local call states that pertain to illuminating lamps (LEDs) and managing call states for display. The manager accepts button events and executes call control commands at the call process manager. The presentation manager also maintains a local line status displayed on the LEDs. The local status is used to indicate operations in progress i.e. "hunt".

The call process manager, referred to as CallProc, acts as the proxy between switch 106 and the turret's telephony application. CallProc maintains copies of calls and line statuses on the switch 106. CallProc both accepts events from and issues events to the switch. Switch events accepted by Callproc include events to setup calls. When switch initiated events causes line or call status change, the changes are sent to the presentation manager for delivery to the telephony application on the turret.

Most of the turret's call processing is initiated by button events generated by a telephony aware application. The events are categorized as traderButtons and KeyCodes events that functionally represent Seize Line, Dial Digits, Release, Hold, Hunt, Conference, Speed Dial, Privacy, Broadcast, Redial, Transfer and their associated states.

Certain call processing operations are initiated from the switch 106. The switch passes CallMsg's (messages) to the turret 114. For example, if a call changes state, an update message with the appropriate events is sent. Typical events include: MuteBegin, MuteEnd, CallPartyEntrance, CallPartyExit, RingInternal, RingGroupXfer, RingBackBegin, RingBackEnd, IntrusionToneBegin, IntrusionToneEnd, RecordWarningBegin, and RecordWarningEnd. To create a call, a CallRequest message is sent. This messaging is used for intercom (ICM) and Internal calls.

The persistent data service provides applications and other services to persistently store and retrieve information. Each of the persistent data services provides a unique interface for that service. The persistent data services are summarized as: call history, user preference/application data; and telephony equipment configuration.

Open Database Connectivity (ODBC) is a SQL-like database client service provided by an embedded database (e.g., a Polyhedra™) operating with the industry standard IP network protocol. The embedded database provides an in-memory database, meaning it holds all its data structures in local system memory.

The present invention deploys ODBC client on the BMU 400 of turret 114. Database requests from turret applications and service are directed to ODBC proxy on the switch 106. The requests are forwarded to the system center 104.

Each ODBC request to the system center 104 database must first pass through the switch 106. Switch 106 may have the database information cached in internal memory. If the information is not resident in switch 106, then switch 106 forwards the database request to the system center 104. The system center 104 fills the database request and returns the data to switch 106. Switch 106 then forwards the database response data to the turret 114.

As described above, platform services provide applications with control of turret hardware. These services are different than the station services that are intended to control telephony features of the system 100. Platform services are proxies that provide applications access to hardware device drivers via the message bus (ccBus).

The platform driver architecture includes the operating system common device interfaces such as networking and a real time clock.

The button service collects the turret's physical front panel button state information; converts it to logical button identifiers and sends it to applications. This service works in conjunction with the front panel button hardware interface platform service and the message bus. The front panel button hardware interface provides the service with the state information of physical front panel's buttons. Using the unit identity platform service, this service generates the logical button identifier. The state change of the logical button is sent to applications via the message bus.

An LED service is the primary application interface to control the turret's front panel LED hardware. The service receives "Set LED" and LED Query commands from applications and provides responses to queries. The service accepts color and blink-rate information from applications via the message bus and sends the information to the turret's front panel LED hardware interface. For queries, LED state and color information are retrieved from the turret's front panel LED hardware interface and returned to the requesting application via the message bus.

An application LED service uses a logical LED identifiers to create a unique identity for each LED. The Logical LED Identifier is derived from the unit's Identity Number and the LED's physical number. The Front Panel LED Hardware Interface provides the Application LED Service with the state information of physical front panel's buttons. The unit's Identity Number is provided by the Unit Identity platform service.

An equipment manager service provides inventory of the turret's hardware configuration. The equipment manager is responsible for comparing the physical modules active at the station to the configuration of the modules in the system center 104 database. The equipment manager service provides the following information to other services and applications: number and types of turret units; number and types of audio devices (handsets, speakers, microphone); number of physical buttons and LEDs; reset button state and mode (service reset or power on reset); and miscellaneous hardware information.

The turret configurations for each turret 114 are stored. If there is inconsistency between physical modules and the modules in the database then an alarm to the system center 104 is generated.

The application infrastructure layer includes subsystems that insulate applications from the distributed nature of the turret's software and provides call methods and the ability to trigger functionality. Applications only receive messages of interest to them. Using the infrastructure, application initiated requests may result in execution of a local operation or dispatch of a message to trigger operations on another turret unit. The application is unaware there may be network transport involved.

More particularly, the subsystems include: a windowing toolkit; session manager; and application manager. The windowing toolkit provides applications with a common API and method to display graphical information on displays. Graphics can include icons, menus, progress bars and volume control indicators.

A session manager is the master application that binds together all the applications into a cohesive experience across the entire turret. The session manager also provides capability to dial an emergency number (E911) even if no trader is logged in to the PTU 500.

The session manager includes the following components: a service that executes exclusively on the BMU 400, and a login manager application which appears on PTU 500 and BU 600 LCD (516, 604a, 604b) screens as needed. The instance of the service running on the BMU 400 is the master, and communicates with delegates on other modules. It does not contain the other applications, but it does direct them to launch, hide, and show in response to turret-wide state changes.

The session manager interacts with the application manager to help synchronize and identify instances of application.

The application manager assists with the instantiates (starts) and shutdown applications. The application manager operates in conjunction the session manager executing on the BMU 400. With the session manager, the application manager establishes a unique identifier for each instance of an application. The application manager is responsible for UI window management and input focus management. Each unit executes an instance of application manager upon initialization (i.e., bootup).

The application manager acts as the windowing server, which means it is responsible for window management, input focus management, and for forwarding raw key press events to the individual applications if those key presses are not to be shipped individually to each application over the message bus.

The applications in accordance with the present invention are software modules that execute in the application layer on the turret hardware. Applications provide the logic that controls the actions of the telephony system 100.

Applications are used to capture trader perspective on telephony services provided through a telecommunications network. The applications are directly responsible for presenting application information to and accepting user input from a trader as well as executing the policies that control telephony hardware.

A program manager application provides the trader to secure the turret; set personal preferences; and inform the other software components that the preferences have changed for the trader. The program manager operates exclusively on the turret's PTU 500.

After successful logon, the program manager operation does not prevent initiating or answering calls or intercom operations irrespective of the program manager's execution state. The handset status area on the PTU (and call options on demand) and the float area on the BU 600 is visible while program manager is running.

Program Manager features/functions as well as the selection and execution of turret applications uses a system of menus items that appear on the PTU LCD 516. The program manager's main menu is displayed at any time by pressing a "Menu" button on turret 114.

The trader navigates through the program manager's menus by pressing the turret navigation keys. A tree of option categories, each of which may lead to submenus, and finally to individual screens that allow various options to be configured or applications to be executed.

The program manager application is a data driven application. All items that appear on the program manager displays, and their organization are retained in an embedded private database, rather than being "hardcoded" in the application. This will allow new options to be developed more easily.

The main program manager application conforms to application infrastructure framework. The infrastructure provides the workflow and APIs to display menus items, lamp LEDs and receive buttons events. Leveraging the infrastructure, the program manager implements business logic and posting of menu item data to the displays.

The program manager interfaces services that provide the application logic with domain specific functionality including: a telephony service including system center 104 logon/logout and turret locking/unlocking; a persistence service including save and retrieve trader preferences; a button service which supplies button events to drive menu selections; a LED service which controls LEDs associated with buttons; and a windowing toolkit for showing menu items on the turret's displays.

A voice mail application executed on PTU 500 supports the voice mail. The trader interacts with the voice mail system using a dial pad, by entering a mail box number and password and then system-specific instructions.

The voice mail application conforms to application infrastructure framework to connect a trader to the voice mail server via switch 106. The infrastructure provides the workflow and APIs to display menus items, operate LEDs and receive buttons events. Leveraging the infrastructure, the voice mail app only implements business logic and posting of menu item data to the displays. In addition, the voice mail application interfaces to services that provide the application logic with domain specific functionality, including: a telephony service, which initiates and terminates call to the voice mail server; a persistence service for retrieving voice mail preferences; a button service, for supplying button events to drive menu selections; an LED service for controlling lamp LEDs associated with buttons; and a windowing toolkit for showing menu items on the turret's displays.

A turret directory provides lists of human readable identifiers (e.g., names) and phone line identifiers. Once a directory entry is selected, it may be dialed automatically via entering handle free mode or by pressing the dial button.

Directories may be navigated by using buttons programmed as navigation keys. Navigation functions include scrolled though one line at a time, paging a full display page. The directories may be navigated (e.g. paged, searched, sorted) in either direction. If the navigation reached the beginning or the end of the directory list, the navigation will continue navigating from the respective last or first directory entry. The directory application assists the call manager in providing core telephony functionality. The directory executes on each of the BUs 600, while the call manager runs exclusively on the PTU 500. The directory assists the user in both placing calls to contacts and in receiving calls from contacts and provides a means to organize, sort and search the contact, line and function key list. Function keys provide the ability to monitor voice mail boxes, divert lines, control turret behavior and execute other turret 114 features.

The directory is organized into three parts: directory buttons, float pool, and search area. In an exemplary embodiment of the present invention, the directory buttons are on the BU 600. Each directory button represents a general line, a path to a specific contact, e.g., direct intercom, speed dial or private line, or a function key. Buttons are grouped into favorites or named directories which may be shared. Favorites are ordered by button number or location while directories are ordered by name or by most frequently used. The button has two portions—a hard button with a multi-colored LED adjacent to a rectangular cell on the LCD. Based on the line type and state, the LED changes colors and blink pattern and the LCD cell changes color and appearance.

Favorites are loaded using a "favorites" hard key and directories are loaded using a directory hard key. Both are browsed using page up/down hard keys. A directory menu on the first soft key allows selection of particular named directories. A view button changes the sort key and order. If a turret 114 has multiple BUs 600, separate directories or favorites may be viewed on each unit. If desired, the Units can be configured to page together when a favorites list is viewed. The trader may toggle between personal and group favorites using the "favorites" hard key.

In an exemplary embodiment of the present invention, the float pool is provided on BU 600. If configured, ringing lines whose favorites and directory appearances are not on a visible page will appear in the float pool. Lines "on hold" and active also float.

The present also includes a search area which allows a user to find a contact by name, description and organization. Results appear on the BU 600.

An intercom directory is a list of all the possible parties that a trader could intercom. This includes other traders on the same system, trader identifiers (TRIDS) from other systems using global intercom, PC-based EHI ("host and intercom") users, users using EHI for global intercom transport.

The intercom directory supports intercom destinations of traders that exist on the switch 106 their turret 114 is connected to as well as other switches 106. ICM directory individual traders may add directory entries to their favorites/home page. Trader can also copy call history entries to their favorites/home page.

The intercom directory defaults with the list of entries that the trader has recently communicated with through the intercom function, with the most recent entry being on top. When a trader first displays the intercom directory, a list of the most recently intercommed entries are displayed in the directory list. The most recently used (MRU) list extends to the most recent intercommed entries (e.g., the 40 most recent intercommed entries). The list also includes all available buttons on the button module (excluding floats) and allows the user to paginate if necessary. From the initial view of most recently intercommed, the user must be capable of changing views to an A-Z listing and searching the list of entries.

The intercom directory indicates the following status: 1) a user is logged in and not on a call; 2) a user is logged in and on a call; and 3) a user is not logged in.

The directory application conforms to application infrastructure framework. The infrastructure provides the workflow and APIs to display menus items, lamp LEDs and receive buttons events. Leveraging the infrastructure, the application implements the logic, posting of menu item data to the displays and playing of ring tones.

The directory application interfaces services that provide the application logic with domain specific functionality, the services including: telephony service, which initiates and terminates a call to the voice mail server; a persistence service, which retrieves directory and directory preferences; a button service, which supplies button events to drive menu selections; an LED service which controls LEDs associated with buttons; a windowing toolkit, which shows menu items on the turret's displays; and an audio service for playing ring tones.

A call manager application provides the core telephony functionality of the turret 114 and is a key component of the user interaction model, providing handset-oriented call control and status. The call manager application executes on the turret's PTU 500.

The call manager application cooperates with the directory application in answering and placing calls and manages the hard and soft buttons and display on the PTU 500 related to handset status and telephony actions.

Telephony actions are organized into handset status, call initiation, call control and audio control categories. Call initiation actions have soft buttons. Call control actions use either soft (programmed) buttons or hard (dedicated) buttons, depending on the specific action. The primary actions have dedicated hard buttons. The secondary actions have soft buttons that are shown in context and on demand. Likewise, audio control actions use either soft or hard buttons, depending on their priority of accessibility.

The call manager displays the status of each handset in two cells of the bottom row on the PTU display, which is always visible as long as a trader is logged in. The display indicates if the handset is idle, or active, and if it is selected for activity (e.g., dial pad input or call placement). If the handset is active, the line, directory and command line interface (CLI) info will show, according to the trader's preference.

The call manager also provides for initiation of certain types of calls using contextual soft keys. When idle, intercom and hunt options show for each side. If the call manager receives keypad button press messages, the call manager initiates a hunt request to the telephony service.

The call manager also provides call control using dedicated hard buttons and contextual soft buttons. There are four dedicated hard buttons for each side. These are release, hold, transfer and conference. When the handset is active and the handset selector is pressed, contextual soft buttons show the call control options. These include privacy, and when applicable, signal, internal transfer and internal invite.

The call manager also provides audio control also using dedicated hard buttons and contextual soft buttons. The hands free speaker has an off/on and volume control knob. The contextual soft buttons show call options for hands-free microphone (HFM) toggle, HFM mute, and handset receive volume up and down.

To make a basic call, the call manager first provisions a turret handset by sending TelephonyKeyCode specifying the handset. The call manager sends the TelephonyKeyCode by instantiating a TelephonyKeyCode object. The call manager can then issue a TelephonyKeyCode with a trader button id mapped to a particular line. The telephony service immediately posts a TraderLineButton event that the line has been seized.

The telephony service then sends the seize request to the switch 106. In this case the request is successful and the call information is sent to the application. The call information contains information about the call as well as the distant end called party.

If the switch 106 denies the call request, no call is established and a new TraderLineButton is sent with a different status (e.g. /e U_BUSY). This may result in the trader button going from one state to another after a short interval.

The call manager application conforms to application infrastructure framework. The infrastructure provides the workflow and APIs to display menus items, lamp LEDs and receive buttons events. Leveraging the infrastructure, the call manager application implements business logic and posting of menu item data to the displays.

The call manager application also interfaces to services that provides the application logic with domain specific functionality, including: telephony service, which initiates and terminates a call to the voice mail server; a persistence service, which retrieves directory and directory preferences; a button service, which supplies button events to drive telephony actions; an LED service which controls LEDs associated with buttons; and a windowing toolkit, which shows call status on the turret's displays.

A call history application provides the capability to view historical telephony activity, call a contact back or save a number as a speed dial. Dial tone and private line calls that were initiated, received or missed (ring abandoned) are tracked.

The call history application listens for TraderLineButton events generated by the telephony service. The events include the tradButtonId that is used to obtain the call line information and call party information. This information is recorded by the call history application as a call record.

The call history service tracks detailed call records and summary intercom call records. Detailed call records include contact data for dialtone and private line calls: category, name, number, line/siteId, time, duration, incoming priority. This data is used by the call history application. To reduce the number of records, lines in the personal and group favorites are monitored for missed calls.

Summary intercom call records include contact data for trader-to-trader and trader-to-broadcast group intercom calls: partyId/siteId, call count, last call date/time. This data is used by the directory application to present intercom directories in most recently used (MRU) and most frequently used (MFU) orders.

The timestamps on call records will use the local station time, but stored in the UTC time zone, which can be synchronized via NTP to a proprietary or customer-provided source.

A running list of the trader's most recent calls (e.g., per category) is accessible by that trader from any turret 114. For example, a running list of 200 per category of the most recent calls is accessible. If there are three categories (i.e., initiated, received, missed) the maximum records per trader would be 600. This is accomplished by persisting the records in the system center 104 database. In the case that the database is unavailable, a file that is local to the turret 114 is used for persistence. The file and the database are periodically synchronized. Similarly, the intercom call summary records are persisted as the detailed call records.

Call records such as call-detail-records (CDR) are generated from the station (by the telephony service) for use by call logger 108, call reporting systems, computer telephony server (CTS) and the like.

Callbacks on an incoming dial tone call record use the trader's default hunt group. This reduces the risk that a callback will fail because the particular line is busy. A callback on an outgoing dial tone call record will use the actual hunt group for a "speed and hunt" button or "hunt and dialpad" sequences. It will use the actual line that other "speed and line" or "line and dialpad" sequences. If the line is busy, the turret does not barge in and the callback is aborted. Since the call record will have the actual dialed digits, the dial plan issues that exist with incoming call records are avoided. For private lines, the callback will use the particular line that was used in the call. If the line is busy, the turret will join the call.

The trader group and trader preferences are optional. The trader-scoped settings override the trader group-scoped settings which override the site-scoped settings. The site-scoped settings are delivered to the switch 106.

The call history application conforms to application infrastructure framework. The infrastructure provides the workflow and APIs to display menus items, lamp LEDs and receive buttons events. Leveraging the infrastructure, the Call History app only implements business logic and posting of call list data to the displays.

The call history application interfaces to services that provide the application logic with domain specific functionality, the services including: telephony service, which initiates calls, call events and CallPartyInformation; a persistence service, which retrieves call and intercom history and call history preferences; a button service, which supplies button events to drive telephony actions; an LED service which controls LEDs associated with buttons; and a windowing toolkit, which shows call status on the turret's displays.

The speaker application allows the trader to select and control turret audio features. The application provides the selection of handsets, speakers, assignment of all channels to speakers and the ability to adjust audio levels and mute microphones.

The speaker application conforms to application infrastructure framework. The infrastructure provides the workflow and APIs to display menus items, lamp LEDs and receive buttons events. Leveraging the infrastructure, the voice mail application implements business logic and posting of menu item data to the displays.

The speaker application interfaces with services to provide the application's business logic with domain specific functionality, the services including: a telephony service, which assigns handset to line, internal and intercom calls; a persistence service, which retrieves speaker preferences; an equipment service, which supplies speaker and audio device configuration; a button service, which supplies button events to mute, drive selections and volume levels; an LED Service, for controlling LEDs associated with buttons; and a windowing toolkit for showing menu items on the turret's displays.

A replay application executed on turret 114 supports the replay of one or more audio channels. Generally, while a call is active through SU 700, the call is recorded locally in a circular buffer (also referred to as an "online" buffer) in the turret 114. When a trader presses a replay button on SU 700, a copy of some or all of the content in the circular buffer is placed in another temporary memory space (also referred to as an "offline" buffer). This temporary memory space is used to further process the audio data (e.g., detection and removal of gaps of silence at the beginning of an audio segment or gaps there between).

The content of the online buffer is replaced with new audio data in real-time. Thus, during reproduction of the contents in the offline buffer, real-time recording of the audio channels is not affected.

Multiple streams, including mixed streams, can be received and recorded simultaneously. In addition, individual audio channel data can be played separately from the mixed stream.

Referring to FIGS. 4 and 7, as voice data is fed from network 118 to Ethernet switch 712 in SU 700, it is intercepted and captured by processor 414 on BMU 400. Processor 414, in turn, communicates the data to DSP 402 for signal processing. DSP 402 also stores the voice data in a predefined circular buffer on SDRAM 406. The circular buffer is an area in SDRAM 406 that is used to store incoming audio channel signals from the different voice channels. When the buffer is filled, new data is written starting at the beginning of the buffer. The circular buffer can be written by one process and read by another.

A user can select from the matrix of buttons 710 an individual channel to replay. This is accomplished using a bit map corresponding to the number of available audio channels. Particularly, a user selects a button, which sets the individual bits of the bitmap. The bitmap is then read by DSP 402 to indicate which channels to playback. Turret 114 can also be configured to play back preset groups of audio channels in response to actuation of a single button from the matrix of buttons 710 in a similar manner.

Only a predetermined amount of the most recently received audio signals is stored in the online buffer. In addition the circular buffer is not persistent. That is the audio information is not permanently stored in the turret. When the module is powered down, or a trader has logged off turret 114, the data is erased from the SDRAM.

A replay button that will playback all audio that was coming out of a speaker for a predetermined length of time with a single button press. The replay could be multiple channels mixed together or from a specific channel.

An administrator can control the amount of audio that is capable of being stored. In an exemplary embodiment, the stored audio is purged (i.e., erased from memory) at the end of a day. Alternatively, the data is erased after a predetermined time. The audio can also be made inaccessible and/or deleted if the end-user is logged out of the station.

When a user elects to playback a channel, the unit continues to record audio for all channels. The unit searches the last predetermined number of seconds that have been recorded and begins playing where the voice activity starts so that a user does not need to fast forward through blank space. Gaps of silence interspersed in the audio signal can also be removed. DSP 402 performs such audio processing functions.

The audio plays back through one or more speakers on the SU 700. In one embodiment of the present invention, audio from the voice channels are played back through one speaker, while audio signals that have been captured and stored in the offline buffer are replayed through another speaker. The multiple speaker configuration advantageously provides spatial separation of the audio signals.

The microphone does not need to be mixed in and the volume is capable of being adjusted using a master volume control.

The same clip can be replayed as necessary. Thus, if a particular segment has been replayed, it is not deleted until either manually deleted or automatically deleted after a predetermined amount of time.

The replay application conforms to the application infrastructure framework to instantly replay the voice channels when a trader presses a replay button on SU 700. The infrastructure provides the workflow and APIs to display menus items, operate LEDs and receive buttons events. Leveraging the infrastructure, the replay application implements business logic and posting of menu item data to the displays to provide a trader with replay options such as replaying audio at an individual channel level.

In addition, the replay application interfaces to services that provide the application logic with domain specific functionality, including: a telephony service, which initiates and terminates a call through switch 106; a button service, for supplying button events to drive menu selections; an LED service for controlling lamp LEDs associated with buttons; and a windowing toolkit for showing menu items on the turret's displays.

Security features are a set of technologies deployed within the turret software to prevent unauthorized access to trader information on the turret. Although there are many security techniques can be deployed, preventing authorized access turret network address and protocol filtering in conjunction with network data encryption to preventing data snooping provides the maximum security benefit at the lowest cost of deployment.

While various embodiments of the present invention have been described above, it should be understood that they have been presented by way of example, and not limitation. It is apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. An apparatus for recording and reproducing one or more audio channel signals, comprising:
    a processor operable to capture one or more audio channel signals communicated through one or more corresponding communication channels over a network;
    a buffer, having a beginning and an end, operable to store the one or more audio channel signals captured by the processor, wherein when the end of the buffer is reached the storing continues at the beginning of the buffer; and
    a button configured to cause, in response to the button being actuated, the processor to copy one or more of the audio channel signals stored in the buffer into a temporary buffer and cause a speaker to audibly reproduce the one or more audio channel signals stored in the temporary buffer,
    wherein the buffer continues to store the one or more audio channel signals captured by the processor while the one or more audio channel signals stored in the temporary buffer are audibly reproduced.

2. The apparatus of claim 1, wherein the audio channel signals are telephonic signals.

3. The apparatus of claim 1, wherein the processor is further operable to perform one or more audio signal processing functions on the one or more audio channel signals.

4. The apparatus of claim 3, wherein the one or more audio signal processing functions comprise removing a silent portion of the one or more audio channel signals.

5. The apparatus of claim 3, further comprising:
    a first speaker operable to audibly reproduce the one or more audio channel signals communicated through the one or more corresponding communication channels; and
    a second speaker operable to audibly reproduce the one or more audio channel signals stored in the temporary buffer,
    wherein the one or more audio signal processing functions comprise spatially separating the one or more audio channel signals communicated through the one or more corresponding communication channels and the one or more audio channel signals stored in the temporary buffer.

6. The apparatus of claim 1, further comprising:
    a second button configured to, in response to the second button being actuated, select a predetermined one of the one or more communication channels and cause the corresponding one or more audio channel signals to be audibly reproduced.

7. The apparatus of claim 1, further comprising:
    a second button configured to, in response to the second button being actuated, select a predetermined plurality of the one or more communication channels and cause the corresponding audio channel signals to be audibly reproduced.

8. The apparatus of claim 1, further comprising:
    a first speaker operable to audibly reproduce the one or more audio channel signals communicated through the one or more corresponding communication channels; and
    a second speaker operable to audibly reproduce the one or more audio channel signals stored in the temporary buffer.

9. The apparatus according to claim 1, wherein the buffer is a memory having a beginning address and an ending address, where the audio channel signals are written and over-written to the memory continuously, such that when the ending address of the memory is reached while writing the audio channel signals, the writing continues by wrapping the ending address to the beginning address.

10. A method for recording and reproducing one or more audio channel signals, comprising the steps of:
    capturing one or more audio channel signals communicated through one or more corresponding communication channels over a network;
    storing the one or more captured audio channel signals in a buffer, having a beginning and an end, wherein when the end of the buffer is reached the storing continues at the beginning of the buffer;
    copying one or more of the audio channel signals stored in the buffer into a temporary buffer in response to an actuation of a button; and
    audibly reproducing the one or more audio channel signals stored in the temporary buffer,
    wherein the buffer continues to store the one or more audio channel signals captured by the processor while the one or more audio channel signals stored in the temporary buffer are audibly reproduced.

11. The method of claim 10, wherein the audio channel signals are telephonic signals.

12. The method of claim 10, further comprising the step of:
    performing one or more audio signal processing functions on the one or more audio channel signals.

13. The method of claim 12, wherein the one or more audio signal processing functions comprise removing a silent portion of the one or more audio channel signals.

14. The method of claim 12, further comprising the steps of:
    audibly reproducing the one or more audio channel signals communicated through the one or more corresponding communication channels through a first speaker; and
    audibly reproducing the one or more audio channel signals stored in the temporary buffer through a second speaker,
    wherein the one or more audio signal processing functions comprise spatially separating the one or more audio channel signals communicated through the one or more corresponding communication channels and the one or more audio channel signals stored in the temporary buffer.

15. The method of claim 10, further comprising the step of:
    selecting, in response to a second button being actuated, a predetermined one of the one or more corresponding communication channels; and
    audibly reproducing the corresponding audio channel signal.

16. The method of claim 10, further comprising the step of:
selecting, in response to a second button being actuated, a predetermined plurality of the one or more corresponding communication channels; and
audibly reproducing the audio channel signals corresponding to the predetermined plurality of the one or more corresponding communication channels.

17. The method of claim 10, further comprising the steps of:
audibly reproducing the one or more audio channel signals communicated through the one or more corresponding communication channels through a first speaker; and
audibly reproducing the one or more audio channel signals stored in the temporary buffer through a second speaker.

18. A turret configured to use the method according to claim 10.

19. The method according to claim 10, wherein the buffer is a memory having a beginning address and an ending address, where the audio channel signals are written and over-written to the memory continuously, such that when the ending address of the memory is reached while writing audio channel signals, the writing continues by wrapping the ending address to the beginning address.

20. An apparatus for recording and reproducing one or more audio channel signals, comprising:
means for capturing one or more audio channel signals communicated through one or more corresponding communication channels over a network;
means for storing the one or more captured audio channel signals in a buffer, having a beginning and an end, wherein when the end of the buffer is reached the storing continues at the beginning of the buffer;
means for copying one or more of the audio channel signals stored in the buffer into a temporary buffer in response to an actuation of a button; and
means for audibly reproducing the one or more audio channel signals stored in the temporary buffer,
wherein the buffer continues to store the one or more audio channel signals captured by the processor while the one or more audio channel signals stored in the temporary buffer are audibly reproduced.

21. The apparatus of claim 20, further comprising:
means for performing one or more audio signal processing functions on the one or more audio channel signals.

22. The apparatus of claim 20, further comprising:
means for audibly reproducing the one or more audio channel signals communicated through one or more corresponding communication channels through a first speaker; and
means for audibly reproducing the one or more audio channel signals stored in the temporary buffer through a second speaker,
wherein the one or more audio signal processing functions comprise spatially separating the one or more audio channel signals communicated through the one or more corresponding communication channels and the one or more audio channel signals stored in the temporary buffer.

23. The apparatus of claim 20, further comprising:
means for selecting, in response to a second button being actuated, a predetermined one of the one or more corresponding communication channels; and
means for audibly reproducing the corresponding audio channel signal.

24. The apparatus of claim 20, further comprising:
means for selecting, in response to a second button being actuated, a predetermined plurality of the one or more corresponding communication channels; and
means for audibly reproducing the audio channel signals corresponding to the predetermined plurality of the one or more corresponding communication channels.

25. The apparatus of claim 20, further comprising:
means for audibly reproducing the one or more audio channel signals communicated through the one or more corresponding communication channels through a first speaker operable; and
means for audibly reproducing the one or more audio channel signals stored in the temporary buffer through a second speaker.

26. The apparatus according to claim 20, wherein the buffer is a memory having a beginning address and an ending address, where audio channel signals are written and over-written to the memory continuously, such that when the ending address of the memory is reached while writing audio channel signals, the writing continues by wrapping the ending address to the beginning address.

* * * * *

UNITED STATES PATENT AND TRADEMARK OFFICE
CERTIFICATE OF CORRECTION

| | | |
|---|---|---|
| PATENT NO. | : 7,904,056 B2 | |
| APPLICATION NO. | : 11/276794 | |
| DATED | : March 8, 2011 | |
| INVENTOR(S) | : Michael Speranza | |

It is certified that error appears in the above-identified patent and that said Letters Patent is hereby corrected as shown below:

COLUMN 1:

Line 56, "playback" should read --play back--.

COLUMN 2:

Line 17, "a" should be deleted.

COLUMN 3:

Line 23, "applications" should read --application--.

COLUMN 5:

Line 49, "a" should read --an--.

COLUMN 6:

Line 34, "hands free" should read --hands-free--.

COLUMN 7:

Line 43, "hands free" should read --hands-free--; and
    Line 60, "are" should read --is--.

COLUMN 8:

Line 41, "from" should be deleted.

Signed and Sealed this
Eighth Day of November, 2011

David J. Kappos
*Director of the United States Patent and Trademark Office*

COLUMN 9:

Line 16, "login" (both occurrences) should read --log in--;
   Line 46, "recognized" should read --recognize--; and
   Line 50, "hands free" should read --hands-free--.

COLUMN 12:

Line 13, "reside" should read --resides--;
   Line 41, "a" should read --an--; and
   Line 67, "more" should read --more of--.

COLUMN 15:

Line 6, "event" should read --events--.

COLUMN 16:

Line 44, "used" should read --be used--.

COLUMN 18:

Line 15, "Callproc" should read --CallProc--;
   Line 15, "switch initiated" should read --switch-initiated--;
   Line 16, "causes" should read --cause--; and
   Line 41, "a" should read --an--.

COLUMN 21:

Line 2, "a" should read --an--; and
   Line 64, "Units" should read --units--.

COLUMN 22:

Line 25, "are" should read --is--.

COLUMN 25:

Line 17, "Service" should read --service--;
   Line 31, "there between)." should read --therebetween).--;
   Line 56, "playback." should read --play back.--; and
   Line 66, "playback" should read --play back--.

CERTIFICATE OF CORRECTION (continued)
U.S. Pat. No. 7,904,056 B2

COLUMN 26:

Line 9, "playback" should read --play back--;
Line 19, "are" should read --is--;
Line 34, "menus" should read --menu--; and
Line 51, "can" should read --which can--.